United States Patent
Ma

(10) Patent No.: US 9,284,200 B2
(45) Date of Patent: Mar. 15, 2016

(54) THERMALLY TREATED EXPANDED PERLITE

(75) Inventor: Jia Ma, Vancouver, WA (US)

(73) Assignee: CONTECH ENGINEERED SOLUTIONS LLC, West Chester, OH (US)

(*) Notice: Subject to any disclaimer, the term of this patent is extended or adjusted under 35 U.S.C. 154(b) by 1600 days.

(21) Appl. No.: 12/540,408

(22) Filed: Aug. 13, 2009

(65) Prior Publication Data

US 2010/0038327 A1 Feb. 18, 2010

Related U.S. Application Data

(60) Provisional application No. 61/088,533, filed on Aug. 13, 2008, provisional application No. 61/099,349, filed on Sep. 23, 2008.

(51) Int. Cl.
*B01D 39/00* (2006.01)
*B01J 20/02* (2006.01)
(Continued)

(52) U.S. Cl.
CPC ............ *C02F 1/288* (2013.01); *B01J 20/0229* (2013.01); *B01J 20/041* (2013.01); *B01J 20/06* (2013.01); *B01J 20/08* (2013.01); *B01J 20/106* (2013.01); *B01J 20/2803* (2013.01); *B01J 20/28004* (2013.01); *B01J 20/28011* (2013.01); *B01J 20/3042* (2013.01); *B01J 20/3078* (2013.01); *B01J 20/3204* (2013.01); *B01J 20/3236* (2013.01); *B01J 2220/58* (2013.01); *B01J 2220/62* (2013.01); *C02F 2101/105* (2013.01);
(Continued)

(58) Field of Classification Search
CPC ........ B01J 20/06; B01J 20/08; B01J 20/0229; B01J 20/041; B01J 20/106; B01J 20/28011; B01J 20/3236; B01J 20/2803; B01J 20/3042; B01J 20/3078; B01J 20/3204; B01J 20/28004; B01D 37/00; B01D 36/04; B01D 29/0027; B01D 39/02; B01D 39/20; B01D 71/02; B01D 71/022; B01D 71/024; B01D 71/025; B01D 71/027; B01D 2239/1241; B01D 2239/1291; C02F 1/288; C02F 2101/001; C02F 2101/105
USPC ...................... 210/502.1; 502/417, 406, 407; 106/DIG. 2
See application file for complete search history.

(56) References Cited

U.S. PATENT DOCUMENTS 2,665,813 A 1/1954 Bollaert et al.
2,699,409 A 1/1955 Hashimoto
(Continued)

FOREIGN PATENT DOCUMENTS

DE 3703137 A1 * 8/1988
WO 2008/140919 11/2008

OTHER PUBLICATIONS

Hoelter Heinz et al., 1988—Machine Translation of German Patent: DE 3703137.*

(Continued)

*Primary Examiner* — Nam Nguyen
(74) *Attorney, Agent, or Firm* — Thompson Hine LLP

(57) ABSTRACT

A thermally treated expanded perlite that can be coated or impregnated with at least one active material and the use of the thermally treated expanded perlite as a light-weight filtration media. Methods for forming thermally treated expanded perlite as well as methods for forming thermally treated perlite coated or impregnated with an active material are also disclosed.

15 Claims, 3 Drawing Sheets

(51) Int. Cl.
  *B01J 20/00* (2006.01)
  *C02F 1/28* (2006.01)
  *B01J 20/04* (2006.01)
  *B01J 20/06* (2006.01)
  *B01J 20/08* (2006.01)
  *B01J 20/10* (2006.01)
  *B01J 20/28* (2006.01)
  *B01J 20/32* (2006.01)
  *B01J 20/30* (2006.01)
  *C02F 101/10* (2006.01)
  *C02F 103/00* (2006.01)
  *C02F 101/20* (2006.01)

(52) U.S. Cl.
  CPC ....... *C02F 2101/20* (2013.01); *C02F 2103/001* (2013.01)

(56) References Cited

U.S. PATENT DOCUMENTS

| | | | |
|---|---|---|---|
| 2,727,827 A * | 12/1955 | Chertkof | 106/409 |
| 2,728,733 A | 12/1955 | Hashimoto | |
| 2,893,303 A * | 7/1959 | Geraci | 396/329 |
| 2,967,149 A | 1/1961 | McCollum et al. | |
| 2,967,154 A * | 1/1961 | Beerman | 502/63 |
| 3,176,054 A | 3/1965 | Einstein et al. | |
| 3,233,011 A | 2/1966 | Kurz et al. | |
| 3,235,635 A | 2/1966 | Riede | |
| 3,323,898 A * | 6/1967 | Pierce | 71/64.07 |
| 3,408,296 A | 10/1968 | Kuhn et al. | |
| 3,416,935 A | 12/1968 | Einstein et al. | |
| 3,441,515 A | 4/1969 | Oshida et al. | |
| 3,515,624 A | 6/1970 | Garnero | |
| 3,985,935 A | 10/1976 | Brodmann | |
| 3,993,498 A | 11/1976 | Koekemoer | |
| 4,064,071 A * | 12/1977 | Gilmour et al. | 502/411 |
| 4,107,376 A | 8/1978 | Ishikawa | |
| 4,175,158 A | 11/1979 | Saunders | |
| 4,183,980 A | 1/1980 | Nielsen | |
| 4,255,197 A | 3/1981 | Peralta et al. | |
| 4,255,489 A | 3/1981 | Nielsen | |
| 4,288,253 A | 9/1981 | Venable | |
| 4,451,294 A | 5/1984 | Popov et al. | |
| 4,462,835 A | 7/1984 | Car | |
| 4,525,388 A | 6/1985 | Rehder et al. | |
| 4,834,889 A | 5/1989 | Schleiffarth | |
| 5,002,696 A * | 3/1991 | White | 252/378 R |
| 5,053,282 A | 10/1991 | Delvaux et al. | |
| 5,073,198 A | 12/1991 | Kurz | |
| 5,077,070 A | 12/1991 | Regutti | |
| 5,082,501 A | 1/1992 | Kurz | |
| 5,085,784 A | 2/1992 | Ostreicher | |
| 5,352,780 A | 10/1994 | Webb et al. | |
| 5,397,755 A * | 3/1995 | Parker et al. | 502/7 |
| 5,422,143 A | 6/1995 | Yiu | |
| 5,624,576 A | 4/1997 | Lenhart et al. | |
| 5,632,889 A | 5/1997 | Tharp | |
| 5,679,133 A * | 10/1997 | Moll et al. | 95/45 |
| 5,679,403 A | 10/1997 | Eder et al. | |
| 5,707,527 A * | 1/1998 | Knutson et al. | 210/660 |
| 5,776,353 A * | 7/1998 | Palm et al. | 210/777 |
| 6,027,639 A | 2/2000 | Lenhart, Jr. et al. | |
| 6,042,743 A | 3/2000 | Clemenson | |
| 6,045,913 A | 4/2000 | Castle | |
| 6,087,301 A | 7/2000 | McNary | |
| 6,429,171 B1 | 8/2002 | Clemenson | |
| 6,458,732 B1 | 10/2002 | Doza et al. | |
| 6,464,770 B1 * | 10/2002 | Palm et al. | 106/409 |
| 6,468,942 B1 | 10/2002 | Sansalone | |
| 6,524,489 B1 * | 2/2003 | Palm | B01D 39/06 210/490 |
| 6,712,898 B2 | 3/2004 | Palm et al. | |
| 7,001,527 B2 | 2/2006 | Stever et al. | |
| 7,025,887 B1 | 4/2006 | Kirts et al. | |
| 7,341,661 B2 | 3/2008 | Sansalone | |
| 2007/0163964 A1 * | 7/2007 | Williamson et al. | 210/736 |
| 2009/0261041 A1 * | 10/2009 | Hu et al. | C02F 1/28 210/665 |
| 2010/0104873 A1 * | 4/2010 | Wang et al. | 428/406 |

OTHER PUBLICATIONS

Hoelter Heinz et al., 1988—Abstract and machine translation of German patent: DE 3703137 A1.*

* cited by examiner

THERMALLY TREATED EXPANDED PERLITE

CROSS REFERENCE TO RELATED APPLICATIONS

This application claims the benefit of U.S. Provisional Application Ser. No. 61/088,533 filed Aug. 13, 2008 and U.S. Provisional Application Ser. No. 61/099,349 filed Sep. 23, 2008, the contents of which are hereby incorporated by reference.

BACKGROUND

The present application relates to thermally treated expanded perlite and, more particularly, to a light-weight filtration media comprising thermally treated expanded perlite. In accordance with particular embodiments, the present invention relates to thermally treated expanded perlite impregnated with active materials and, more particularly, to a light-weight filtration media comprising expanded perlite thermally impregnated with at least one active mineral, such as calcium, magnesium, aluminum, or iron. In accordance with one aspect of the present invention, the disclosed light-weight filtration media has the capacity to remove microbial matter from an aqueous composition. In accordance with another aspect, the filtration media has the capacity to remove dissolved phosphorus from an aqueous composition containing phosphorus. In accordance with yet another aspect of the present invention, the disclosed light-weight filtration media has the capacity to remove dissolved metals, such as copper, zinc, lead, nickel and cadmium, from an aqueous composition containing dissolved metals. Methods for forming thermally treated expanded perlite and expanded perlite thermally impregnated with active materials are also disclosed.

Widely used as a filtration media to remove particulate matter in stormwater runoff because it is light-weight, cost effective, and environmentally friendly, expanded perlite has some disadvantages that limits its application. Expanded perlite in the dry form carries dusty fines on its surface. When the expanded perlite contacts water, the dusty fines are washed from the surface of the perlite and increase the turbidity of the water. Furthermore, conventional expanded perlite is limited as far as its application as a filtration material because it is friable and is characterized by a low crush strength. Therefore, there is a need in the art for a filtration media comprising expanded perlite in a form that is less friable, contains fewer fines and exhibits improved crush strength.

In addition to its use as a direct filtration media, expanded perlite can also provide a desirable platform for adsorptive filtration media that could be engineered to selectively remove unwanted components from an aqueous composition such as stormwater or wastewater. Because of its siliceous nature, perlite has affinity to some selected actives, one of which is quaternary ammonium chloride, to remove microbial matter in the water. However, the efficacy of conventional expanded perlite to remove microbial matter is significantly reduced by the tendency of the surficial fines to wash away in the water. Moreover, the actives attached to the surficial fines could also be washed away into the water. Accordingly, effectiveness of expanded perlite as a filtration media could be increased by reducing the number of surficial fines on the perlite.

Perlite also has a very low affinity for common active minerals, such as calcium, magnesium, aluminum and iron, which have the capacity to remove dissolved phosphorus from an aqueous composition. It would be beneficial if the expanded perlite could be modified to remove certain components from an aqueous composition.

SUMMARY

One aspect of the present invention relates to a composition comprising thermally treated expanded perlite. In accordance with certain embodiments, the thermally treated expanded perlite is useful as a filtration media.

Another aspect of the present invention relates to a composition comprising thermally treated expanded perlite impregnated with at least one active material capable of removing dissolved constituents from an aqueous composition.

In accordance with another aspect, a light-weight adsorptive filtration media is provided comprising thermally treated expanded perlite or thermally treated expanded perlite impregnated by at least one active material capable of removing dissolved constituents or contaminants from an aqueous composition.

In accordance with another embodiment, the expanded perlite is thermally impregnated with at least one active mineral such as calcium, magnesium, aluminum or iron having the capacity to remove dissolved phosphorus from an aqueous composition. In accordance with a more particular aspect, an active mineral such as a calcium compound or activated alumina is impregnated into expanded perlite pellets by heating such that the calcium/aluminum mineral diffuses into the pores of the perlite.

In accordance with yet another aspect, a separation system for separating contaminants from an aqueous composition comprises a tank with an inlet for receiving the aqueous composition and an outlet for transferring treated water out of the tank. The tank includes a treatment chamber containing a light-weight filtration media comprising thermally treated expanded perlite or expanded perlite thermally impregnated with at least one active material.

Another aspect relates to a method for producing thermally treated expanded perlite. Expanded perlite pellets may be heated to a temperature of about 850 to 1300° C. to reduce the volume of the perlite pellets with only marginal weight loss.

Yet another aspect relates to a method for producing expanded perlite thermally impregnated with an active mineral. An aqueous slurry containing an active mineral such as calcium, magnesium, aluminum, or iron may be added to expanded perlite pellets. The aqueous slurry may optionally include a dispersant. The perlite pellets in the slurry may be heated to evaporate the moisture and then the composition is heated to a temperature of about 850 to 1300° C. to reduce the volume of the perlite pellets and impregnate the perlite pellets with the active mineral.

In accordance with a particular aspect of the present invention, an aqueous slurry containing calcium carbonate and a dispersant is added to expanded perlite pellets, then the composition is heated to a temperature of about 850 to 1300° C. to dry up the moisture content and reduce the volume of the perlite pellets thereby causing decomposition of the calcium carbonate to calcium oxide. Decomposition of the calcium carbonate to calcium oxide provides an active form of the calcium capable of precipitating dissolved phosphorus from an aqueous composition containing phosphorus such as stormwater runoff or wastewater.

DETAILED DESCRIPTION

Figure 1:
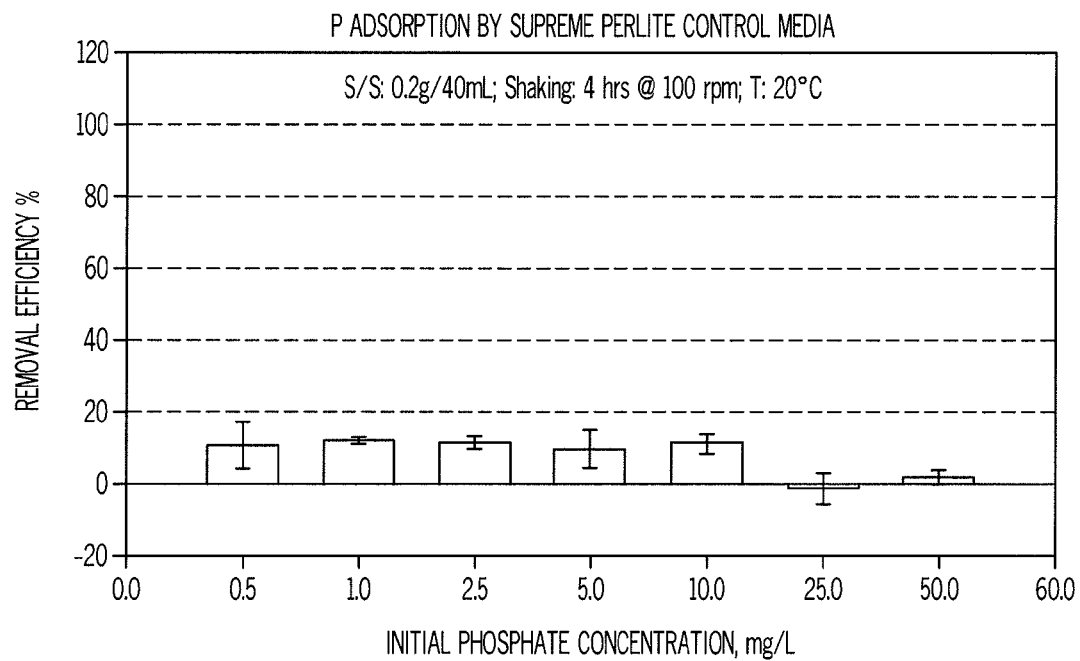
FIG. 1 is a graph illustrating the dissolved phosphorus removal efficiency for a control perlite media as a function of initial phosphate concentration.

The present application relates to thermally treated expanded perlite. The thermally treated expanded perlite typically exhibits improved crush strength and reduced fines as compared to the untreated expanded perlite. The thermally treated expanded perlite material may be used as a light-weight filtration media directly or as a platform for an active containing media for the removal of contaminants from stormwater runoff or wastewater. The thermally treated perlite may be coated or impregnated with one or more active materials to provide certain functionalities to the filtration media.

In accordance with one aspect of the invention, the thermally expanded perlite is impregnated with at least one active material capable of removing dissolved constituents in an aqueous composition. The thermally impregnated expanded perlite material may be used as a light-weight adsorptive filtration media for the removal of dissolved phosphorus and/or dissolved metals such as copper, zinc, lead, nickel and cadmium in stormwater runoff or wastewater.

Expanded perlite pellets (typically ranging in size of about 2.0 mm-25.0 mm with a bulk density of 2 to 25 lbs/ft$^3$ or 32 to 400 kg/M$^3$) can be thermally processed to shrink them with marginal weight loss. As used herein, the term "thermally treated expanded perlite" refers to expanded perlite that has been reduced in size during a high temperature treatment. Typically, the temperature treatment of the expanded perlite pellets results in a reduction of volume from about 20% to about 70%, more particularly from about 40% to about 60%; in accordance with certain embodiments, the perlite pellets are reduced to about 50% of the starting volume for the untreated expanded perlite. The thermally treated perlite typically exhibits improved crush strength and reduced amount of fines on the surface of perlite pellets as compared to the untreated media. The resulting perlite pellets are still porous and light-weight with a bulk density of about 4 to 50 lbs/ft$^3$ or 64 to 800 kg/M$^3$, more particularly about 15 to 35 lbs/ft$^3$ or 240 to 560 kg/m$^3$.

In accordance with certain embodiments, the heating temperature falls in the range of about 850 to 1300° C. (1562 to 2372° F.) and the heating time is typically about 10 minutes to 10 hours. Of course, these parameters can vary provided the heating results in a certain extent of shrinkage of the expanded perlite pellets. Excessive temperatures with prolonged heating time should be avoided to prevent fusion of the perlite pellets because agglomeration of the perlite pellets can result in a severe reduction or complete loss of their pore structure, which is not appreciated in the adsorptive media application in the aqueous solution filtration process.

Thermally treated expanded perlite in accordance with certain embodiments of the present invention exhibits significantly reduced levels of dusty fines. Dusty fines refer to particles that are smaller than about 0.5 mm in the media filtration application. The following procedure can be used to measure dust fines coming off media pellets. Accurately measured dry media pellets are loaded to a flow-through column. The outlet of flow-through column is sealed with a 0.5 mm screen. Then, tap water is flowed through the column until the effluent is clean. The well washed media pellets are unloaded, dried and weighed afterwards. The weight difference of media is attributed to dust fines coming off the media pellets.

Dusty fines typically account for about 20-40% by weight of commercially available expanded perlite. By contrast, thermally treated expanded perlite in accordance with certain embodiments of the present invention typically contains less than about 5% dusty fines, more particularly less than about 1% and in some cases less than about 0.2% dusty fines. Thermally treated expanded perlite in accordance with certain embodiments exhibit a dusty fines percentage by weight of at most ¼, in some cases at most ⅛, in still other cases at most 1/20, in certain cases at most 1/40, in yet other cases at most 1/100, and in particular cases at most 1/200 of the dusty fines percentage for the untreated expanded perlite pellets.

Thermally treated expanded perlite in accordance with certain aspects of the present invention exhibits a significantly narrower particle size distribution when compared to expanded perlite that has not been subjected to the thermal treatment process described herein. For example, the control expanded perlite may have a particle size range of about 2-25 mm. After thermal treatment, size range of perlite may be reduced to about 1.4-12.5 mm, and with the majority of the particles in a size range of about 2-6.3 mm, which is the typical media size in the filtration application.

The thermally treated expanded perlite can be used directly as a filtration media or the perlite can be modified to include an active material. The perlite particles can be coated or otherwise modified to include one or more active materials. In accordance with certain aspects, the perlite particles are impregnated with the active material. Any coating process typically used to coat particles can be used to coat the perlite particles with an effective amount of the active material. Quaternary ammonium chloride is one example of an active that can be coated or otherwise applied to the thermally treated expanded perlite to provide a functional filtration media capable of removing microbial matter. Active materials that can be used are not particularly limited and can be readily identified by one of ordinary skill in the art depending on the particular conditions and contaminants to be removed.

The expanded perlite pore structure is condensed by the high temperature treatment (calcination). This process facilitates impregnation of the expanded perlite pellets with active materials such as active minerals like calcium, magnesium, aluminum and iron. During the high temperature heating process, the active materials are diffused into the pores of the expanded perlite. With the shrinkage of the expanded perlite when subjected to heating, the diffused active materials are secured and impregnated in the pores of the perlite pellets. As used herein, the terms "expanded perlite thermally impregnated with at least one active material" and "thermally impregnated expanded perlite" refer to thermally treated expanded perlite that has been impregnated with at least one active material.

The thermally impregnated expanded perlite media can be used to selectively sequester and remove constituents of an aqueous composition by reacting the constituents with the active material. For example, impregnation of calcium results in an active-containing perlite media that reacts with and removes dissolved phosphorus in a solution such as stormwater runoff or wastewater.

In accordance with one aspect, expanded perlite thermally impregnated with calcium may be formed by preparing a slurry of water, a dispersant (such as corn starch) and calcium carbonate, and then mixing perlite with the slurry, and heating the coated perlite pellets at an elevated temperature to cause shrinkage of the perlite and impregnation of the perlite with the calcium. At temperatures higher than about 850° C., the calcium carbonate is thermally decomposed to calcium oxide, which is the ultimate active to precipitate dissolved phosphorus from an aqueous composition containing phosphorus. In accordance with this particular aspect, decomposition of the calcium carbonate to calcium oxide is important to the functionality of the finished filtration media since calcium carbonate typically exhibits little, if any, capability of removing dissolved phosphorus while calcium oxide is an effective form of calcium for removing phosphorus.

Expanded perlite is derived from perlite ore, which belongs to the class of natural glasses. Perlite ore is a hydrated natural glass typically containing about 72-75% $SiO_2$, 12-14% $Al_2O_3$, 0.5-2% $Fe_2O_3$, 3-5% $Na_2O$, 4-5% $K_2O$, 0.4-1.5% CaO (by weight), and small concentrations of other metallic elements. Perlite ore is distinguished from other natural glasses by a higher content (2-10% by weight) of chemically bonded water, and a characteristic concentric or arcuate onion skin-like structure (i.e., perlitic fractures).

Perlite products may be prepared by methods such as milling, screening, and thermal expansion. Perlite particles are typically characterized by high porosity, low bulk density and chemical inertness. Expanded perlite particles can be used as filtrates, light-weight insulating materials, filler materials, and chemical carriers. Perlite ore is crushed, ground and separated to a predetermined particle size range, then the separated material is heated in air at a temperate of 870-1100° C. in an expansion furnace where the simultaneous softening of the glass and vaporization of contained water leads to rapid expansion of glass particles to form a glass material with a bulk volume up to 20 times that of the unexpanded ore. Expanded perlite typically includes one or more cells, or parts of cells, in which a cell is essentially a void space partially or entirely surrounded by walls of glass, usually formed from expansion of gases when the glass is in a softened state. The presence of gas-filled or vacuous cells in a given volume of glass results in a lower density.

The intricate cellular structure of expanded perlite is particularly effective for the physical entrapment of particles in filtration processes. The expanded perlite products can be used to separate components, especially particulate matter or other contaminants from solutions, fluids, and fluid suspensions.

Although the present invention is described primarily with reference to the use of calcium as an active material for producing the thermally impregnated expanded perlite, other active materials can also be used. Examples of other materials that may be used include aluminum, iron and magnesium. Also having the capacity to react with and remove dissolved phosphorus, other uncommon active minerals could be used such as barium, copper, lead, etc. The sources of the various elements are not particularly limited and may be selected from salts of the active materials. Specific examples of starting materials that may be used to incorporate aluminum, iron, calcium or magnesium include activated alumina, $Al_2O_3$, $Al(OH)_3$, $AlO(OH)$, $Fe_2O_3$, $FeO(OH)$, $Fe(OH)_3$, $CaCO_3$, $Ca(C_2H_3O_2)_2$, $Ca(HCO_3)_2$, $Ca(OH)_2$, $CaSiO_3$, $CaO$, $MgCO_3$, $Mg(C_2H_3O_2)_2$, $Mg(HCO_3)_2$, $Mg(OH)_2$, $MgSiO_3$ and MgO. The starting material used in forming a slurry with the perlite pellets may be the active form of the material (as with calcium oxide) or, as with the calcium carbonate, may be a relatively inactive form of the material that can be converted to an active form during the heating process.

Aluminum oxide or alumina is a particularly useful active material. Moreover, activated alumina which can be produced by dehydroxylating aluminum oxide is particularly useful in accordance with certain aspects of the present invention. Activated alumina is a highly-porous material that can have a surface area significantly over 200 $m^2$/g. The large number of small pores in activated alumina increases the activity of the alumina with respect to its ability to remove phosphorous and other constituents from an aqueous composition. AA100 (available from Alcan) is an example of a commercially-available activated alumina that is useful in accordance with certain aspects of the present invention.

In accordance with one aspect, a slurry containing the active material in the expanded perlite is prepared to provide a weight ratio of active material to expanded perlite sufficient to provide impregnated perlite pellets having an effective concentration of the active material. Typically, the weight ratio of active material to expanded perlite will be from about 1 to 15 and 2 to 1, more particularly from about 2 to 15 and 1 to 1 and in accordance with certain embodiments may range from about 1 to 5 and 1 to 2.

A binder may be used to adhere the active material to the perlite particles. Examples of suitable binders include natural binders such as clay and synthetic binders which provide adhering capacity without side effects during and after heat treatment. VOLCLAY® Supergel, a high-yield bentonite clay (commercially available from American Colloid Co.), is one example of a binder that can be used in accordance with certain embodiments of the present invention.

The amount of binder to be used can be readily determined by one of ordinary skill in the art. Typically, the binder is present in an amount of about 1% to about 15%, more particularly from about 2% to about 10%, and in accordance with certain embodiments from about 3 to about 5% on a dry weight basis of the coated perlite media.

The slurry may include a dispersant such as corn starch to facilitate preparation of the slurry composition. Typically, a dispersant will be completely burned out in the heating process. The amount of the dispersant used in preparing the slurry is not particularly limited but can be readily determined by one of ordinary skill in the art. Additives are not limited to corn starch. Other common starch or organic matter could also be used to disperse the active materials in the slurry forming process. Phosphorus-free materials may be particularly useful in applications directed to removal of phosphorus.

The nominal and usable ranges for the percent solids of the slurry composition may be readily determined by one of ordinary skill in the art to provide a suitable composition.

The slurry typically is mixed until a homogeneous composition is obtained. Then the coated perlite pellets may be heated to evaporate moisture content. The dried and coated perlite pellets are then heated to a temperature range of about 850 to 1300° C., typically for about 10 minutes to 10 hours, to reduce the volume of the perlite pellets. Typically, the temperature treatment of the expanded perlite pellets results in a reduction of volume from about 20% to about 70%, more particularly from about 40% to about 60%; and in accordance with certain embodiments, the perlite pellets are reduced to about 50% of the starting volume.

In accordance with certain aspects, the resulting thermally impregnated perlite pellets have a bulk density in a range of about 4 to 50 lbs/ft$^3$ or 64 to 800 kg/m$^3$, and preferably 5-40 lbs/ft$^3$ or about 80-640 kg/m$^3$ and a typical size range of 0.5 mm to 12.5 mm with the majority of the coated media pellets falling between 2 mm and 6.3 mm, which is the typical filtration media size range used for the particulate matter removal in stormwater treatment.

The size of finished filtration media product typically used in stormwater treatment generally falls into the nominal range of 0.5 to 12.5 mm. The finer the media size, the better particle removal efficiency. However, the smaller size particles have a tendency to clog and provide a shorter life time of media usage. Larger particle size media provide longer longevity but at a relatively low particle removal efficiency. Therefore, the selection of media size range is dependent on the characteristics of the stormwater runoff such as particle concentration and size distribution, and the site specific treatment objective.

The media particles or pellets usually have an irregular shape. Since the particles are not spherical in shape, the actual diameter cannot be measured. Instead, equivalent diameter is determined and used to characterize the size of the pellets or particles. Equivalent diameter can be obtained by passing the particles through a series of mechanical sieves with decreasing opening meshes. Large particles will be intercepted by the sieve with large opening meshes while the finer particles will fall through the large opening meshes and subsequently be trapped in the fine opening meshes. All of the particles intercepted by the mechanical sieves with different opening meshes are collected and measured using conventional procedures.

In accordance with certain aspects, the porous expanded perlite pellets with the size of 2.0-25 mm were used as stock material. After heating, these pellets shrink to a certain extent depending on the combination of heating temperature and time. In accordance with certain embodiments, the bulk volume of the pellets may be reduced to about half. More specifically, the size of each pellet typically may be reduced to the range of about 0.5 to 12.5 mm.

In accordance with particular aspects, the finished coated or impregnated thermally treated expanded perlite pellets have a size range of about 0.5 to 12.5 mm wherein the particle size distribution is based on the mass percentage. Mechanical sieves with different opening meshes are used to measure the size of pellets.

Moreover, the resulting media exhibit improved crush strength, in some cases as much as 2 times the crush strength of the control perlite pellets. For example, in accordance with certain embodiments, the crush strength of the finished perlite media is at least 6 lbs, typically within the range of 8 to 20 lbs, while the control perlite typically has a much lower value that can be difficult to measure because of the friability of the expanded perlite media. The crush strength of the thermally treated expanded perlite in certain embodiments may be from about 1.25 to about 10 times, more particularly from about 1.5 to about 5 times, and in certain cases from about 2 to 4 times the crush strength of the untreated expanded perlite pellets. Crush strength of a perlite pellet can be measured using a force dial to measure the force exerted to crush the pellet. Generally 10 or more determinations are made from a given sample and the crush strength values averaged.

Filtration media comprising the expanded perlite thermally impregnated with aluminum, iron, calcium or magnesium minerals are particularly useful in the removal of dissolved phosphorus in stormwater runoff. Furthermore, the light-weight filtration media in accordance with certain aspects of the present invention provides improved dissolved metals removal which is believed to be due to synergistic adsorption and precipitation effects in the aqueous solution.

Figure 5:
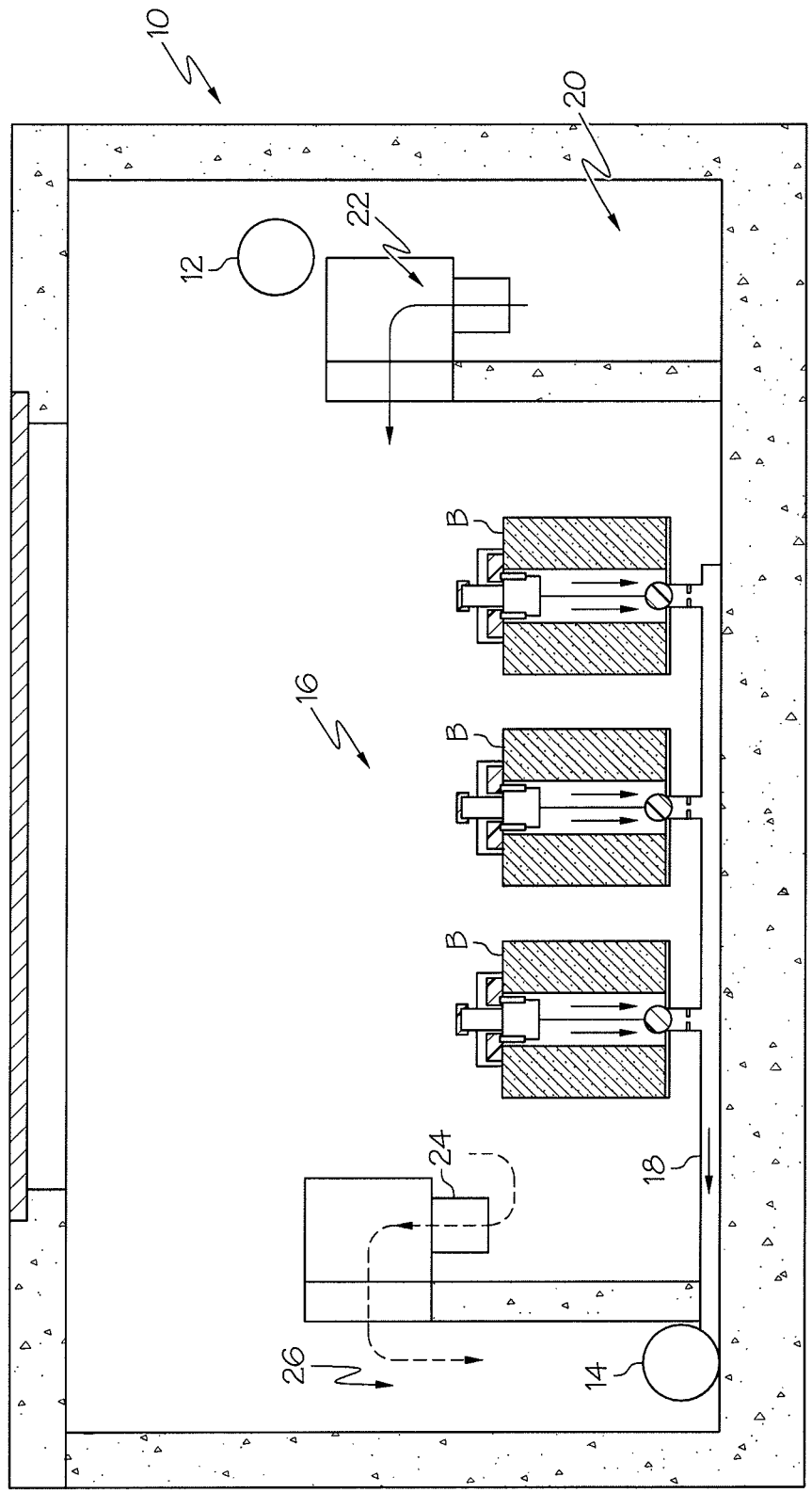
FIG. 5 is a schematic cross-sectional view of a separation system utilizing the media described herein.

The light-weight filtration media described herein may be used as part of a separation system to separate contaminants from an aqueous composition such as stormwater runoff or wastewater. For example, as shown in FIG. 5, a typical separation system may include a tank or vault 10 with an inlet 12 for receiving the aqueous composition and an outlet 14 for transferring treated water out of the tank or vault 10. Disposed within the tank vault may be a treatment zone 16 containing a plurality of baskets B. Each basket contains a bed of the light-weight filtration media comprising thermally treated expanded perlite or expanded perlite thermally impregnated with at least one active material as described herein. Several of the baskets may be connected to a common treated water drainage duct 18. The system may also include a settling forebay 20 where the incoming water resides for a residence time sufficient to allow settling of large particulates and other debris. The water then overflows from the settling bay through an overflow clarifier 22 into the treatment zone. When storm water inflow into the treatment zone 16 greatly exceeds the capability of the treatment baskets to treat water, then the water level in the treatment zone will rise. At some point, the water may overflow from the treatment zone through the overflow inlet 24 and thence into the overflow bay 26 from which it is removed by the outlet 14. In operation, the separation system enables removal of undesirable material from the aqueous composition as the aqueous composition flows from the inlet to the outlet and through the treatment chamber containing the light-weight filtration media. As the contaminated aqueous composition flows through the filtration media, the filtration media removes undesirable contaminants such as phosphorus and dissolved metals. The treated water is transferred out of the tank through the outlet. The treatment zone may be a separate component disposed in the tank or simply a portion of the tank that is used for filtration. The media may be used in conjunction with the filtration system described in PCT Patent Publication No. WO/2008/140919, U.S. Pat. No. 5,707,527 and U.S. Pat. No. 6,027,639, the contents of which are hereby incorporated by reference.

The following examples are representative of certain aspects of the present invention, but are in no way limiting as to the scope of the invention.

EXAMPLES

Example 1

The following provides a basic description of one procedure that can be used to produce thermally impregnated expanded perlite media:

The stock materials:
1. Expanded perlite (2.4-12.5 mm).
2. $CaCO_3$ or other compounds of Ca and/or Mg mineral ($Ca(C_2H_3O_2)_2$, $Ca(HCO_3)_2$, $Ca(OH)_2$, $CaO$, $CaSiO_3$, $MgCO_3$, $Mg(C_2H_3O_2)_2$, $Mg(HCO_3)_2$, $Mg(OH)_2$, $MgSiO_3$ and $MgO$).
3. Corn starch or other starch, or other organic matter functions as inactive dispersant and will be burned out during the thermal treatment.
4. Water or other mixing reagent.

Procedure:
1. Select the appropriate dosage of stock materials. For example, weight ratio of $CaCO_3$ to expanded perlite may typically be between approximately ⅕ and ⅓.
2. Mix slurry from water, corn starch and calcium carbonate. Then, mix perlite pellets with the slurry homogenously.
3. Heat the coated perlite pellets at 105° C. to evaporate moisture content.
4. Continue heating the coated perlite pellets at 550° C. to burn out starch.

5. Continue heating the coated perlite pellets at 1050° C. (1922° F.) for 3 hours (or in the temperature range of 850-1300° C. (1562-2372° F.) and heating time of 10 minutes to 10 hours) to reduce the volume of perlite pellets in half and decompose calcium carbonate to calcium oxide.

Example 2

Expanded Perlite Impregnated with Calcium Oxide

1. Mix slurry from water (45 ml), corn starch (10 g) and calcium carbonate (about 3 g). Then, mix perlite pellets (15 g) with the slurry homogenously.
2. Heat the coated perlite pellets at 105° C. for 1 hour to evaporate moisture content.
3. Continue heating the coated perlite pellets at 550° C. for 0.5 hour to burn out starch.
4. Continue heating the coated perlite pellets at 1050° C. (1922° F.) for 3 hours to reduce the volume of perlite pellets and decompose calcium carbonate to calcium oxide.

Figure 2:
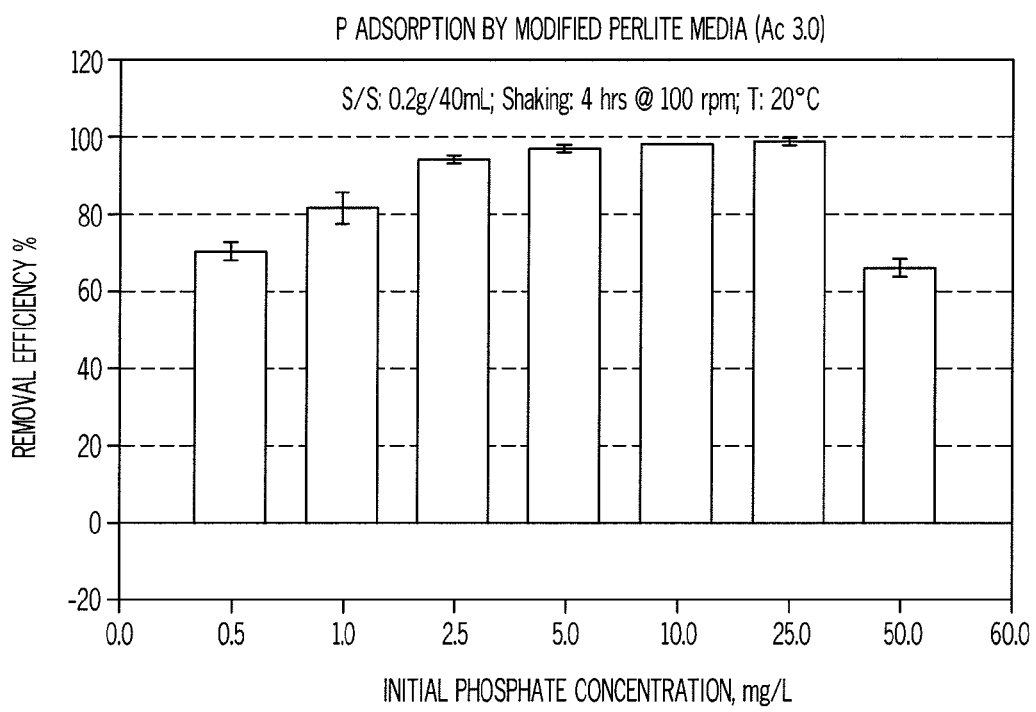
FIG. 2 is a graph illustrating the dissolved phosphorous removal efficiency for a modified perlite media in accordance with a particular embodiment as a function of the initial phosphate concentration.

The calcium oxide containing perlite pellets of Example 2 were tested to determine the efficacy of the media for removing phosphorus and compared to supreme perlite as a control media. From the plots shown in FIGS. 1 and 2, supreme perlite has a dissolved phosphorus removal efficiency of about 10% while modified perlite media in accordance with Example 2 has a much improved removal efficiency of 65% to 100% for the starting dissolved phosphorus concentration of 0.5 to 50.0 mg/L.

Example 3

Expanded Perlite Thermally Impregnated with Activated Alumina

Expanded perlite thermally impregnated with activated alumina can be prepared in accordance with the following process. Particles of expanded perlite in accordance with this example are coated with a composition of clay and activated alumina by making a slurry of clay and water, adding activated alumina to the clay slurry and then introducing the slurry to particles of expanded perlite to coat the perlite particles. Then, the coated perlite particles are heated at a temperature in the range of 900 to 1200° C. for a duration of about 1 to 3 hours to shrink the volume of the perlite pellets and impregnate the activated alumina into the perlite. The resulting media is light-weight (<400 kg/m$^3$) and has a specific surface area of approximately 20-30 m$^2$/g.

More specifically, activated alumina coated media in accordance with a particular embodiment can be prepared as follows:
1. Mix slurry from water (30 ml), clay (1 g) and activated alumina (about 15 g);
2. Then, mix perlite pellets (15 g) with the slurry homogenously; and
3. Heat the coated perlite pellets at 1050° C. (1922° F.) for 3 hours to reduce the volume of perlite pellets in half to produce perlite media thermally impregnated with activated alumina.

Figure 3:
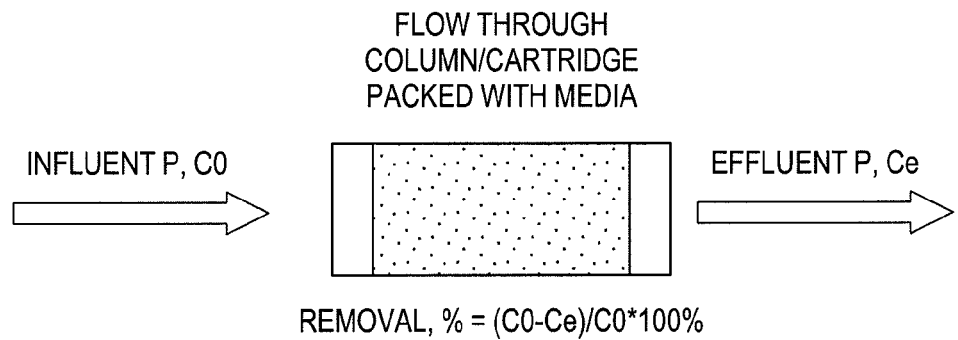
FIG. 3 is a schematic of the basic flow-through test setup used for testing the efficiency of a media.

The expanded perlite thermally impregnated with activated alumina from Example 3 was subjected to flow-through testing to determine the efficiency and the capacity of the media. A schematic of the basic flow-through test setup is illustrated in FIG. 3. An influent having a known concentration of phosphorus (C0) is passed through a column/cartridge packed with the media to be tested. The phosphorus concentration in the effluent (Ce) is measured and the efficiency of the media is determined based on the percent removal:

Removal,%=[(C0−Ce)/C0]*100

The capacity of the media can be quantified by determining the number of empty bed volumes the media can treat and still maintain a certain level of removal efficiency. The empty bed volume is calculated as follows:

Empty Bed Volume(EBV)=Treated Volume/Adsorption column/cartridge Volume

Figure 4:
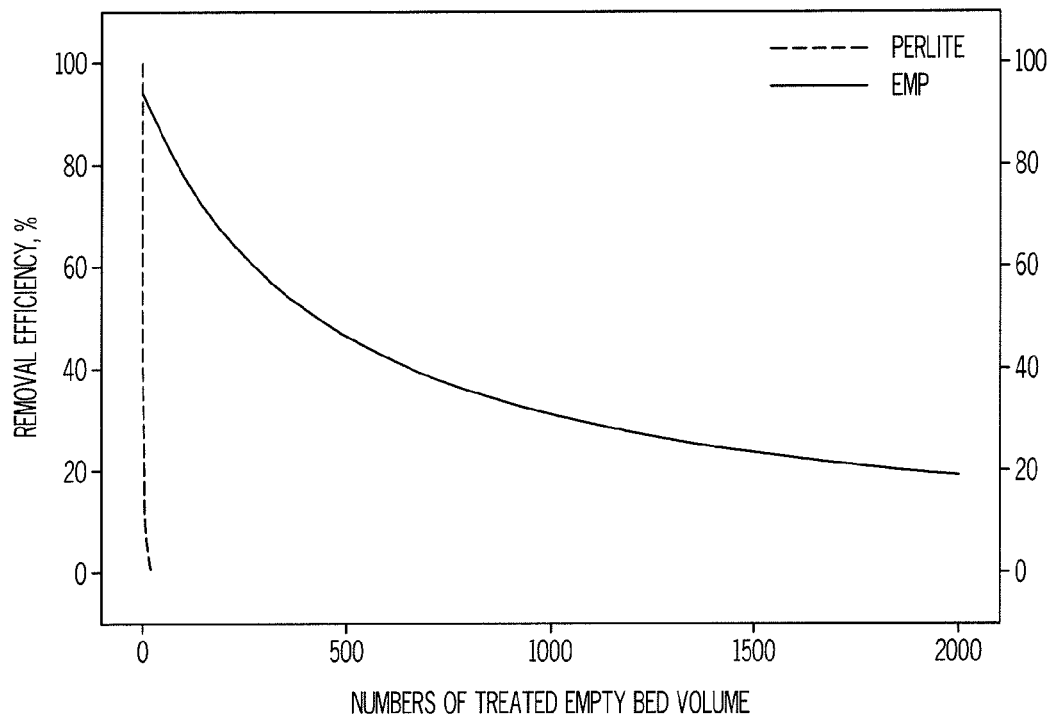
FIG. 4 is a plot of removal efficiency as a function of the number of treated empty bed volumes for the media in Example 3 compared to an uncoated control media with respect to removal of phosphorus.

In flow-through testing, the activated alumina coated perlite media of Example 3 provides an average 50% removal of dissolved phosphorus at an influent concentration of 0.5 mg/L for the first 1000 treated empty bed volumes. FIG. 4 is a plot of removal efficiency as a function of the number of treated empty bed volumes. The activated alumina coated perlite of Example 3 (identified as EMP on the plot) still provides a removal efficiency of about 20% even after 2000 treated empty bed volumes. By comparison, uncoated perlite control media (identified as PERLITE on the plot) can only last for a few empty bed volumes before it is exhausted.

The expanded perlite thermally impregnated with an active material in accordance with certain embodiments provides an average removal efficiency of at least 20%, more particularly at least 40%, in some cases at least 50%, at least 60%, at least 70%, at least 80%, at least 90% or even at least 95% for various influent concentrations of a contaminant that is targeted for removal.

While the present invention has been described by specific embodiments thereof, it should not be limited thereto, since obvious modifications will occur to those skilled in the art without departing from the spirit of the invention or the scope of the following claims.

What is claimed is:

1. A light-weight filtration media comprising thermally treated expanded perlite in the form of pellets wherein said thermally treated expanded perlite has a volume that is at least about 40% less than the volume of the expanded perlite prior to being subjected to thermal treatment so that an average particle size of the thermally treated expanded perlite pellets is between about 0.5 mm and about 12.5 mm, wherein said thermal treatment is conducted at one or more temperatures and for a time period sufficient to result in the reduction in volume.

2. The light-weight filtration media according to claim 1 wherein said light-weight filtration media is in the form of pellets having an average crush strength of at least 6 lbs as measured using a force dial.

3. The light-weight filtration media in accordance with claim 2 wherein said active material comprises an element selected from the group consisting of calcium, magnesium, aluminum, iron, and mixtures thereof.

4. The light-weight filtration media in accordance with claim 2 wherein the light-weight filtration media provides a removal efficiency of at least 20% with respect to a targeted contaminant.

5. The light-weight filtration media in accordance with claim 1 wherein said active material comprises activated alumina.

6. The light-weight filtration media in accordance with claim 1 wherein said active material comprises goethite, iron oxide, iron hydroxide or iron oxide hydroxide.

7. The light-weight filtration media in accordance with claim 1 wherein said thermally treated expanded perlite comprises an active material.

8. The light-weight filtration media in accordance with claim 7 wherein said active material comprises activated alumina.

9. The light-weight filtration media in accordance with claim 7 wherein the active material is coated on said thermally treated expanded perlite.

10. The light-weight filtration media in accordance with claim 7 wherein the active material is thermally impregnated in the thermally treated expanded perlite.

11. A method for removing contaminants from an aqueous composition comprising:
   contacting an aqueous composition containing contaminants with a filtration media in accordance with claim 1.

12. A separation system for separating contaminants from an aqueous composition comprising:
   a tank with an inlet for receiving the aqueous composition and an outlet for transferring treated water out of the tank; and
   a treatment chamber disposed in the tank wherein the treatment chamber contains a light-weight adsorptive filtration media in accordance with claim 1.

13. A method of producing a light-weight filtration media comprising thermally treated expanded perlite in the form of pellets, the method comprising:
   thermally treating expanded perlite pellets to produce said thermally treated expanded perlite, wherein said thermally treated expanded perlite has a volume that is at least about 40% less than a volume of the expanded perlite pellets prior to being subjected to thermal treatment, wherein said thermal treatment is conducted at one or more temperatures and for a time period sufficient to result in the reduction in volume.

14. The method of claim 13, further comprising coating the expanded perlite pellets with an active material prior to said thermal treatment so as to thermally impregnate said active material into the thermally treated expanded perlite as a result of said thermal treatment.

15. The method of claim 14 wherein said active material comprises activated alumina.

\* \* \* \* \*